(12) United States Patent
Harada et al.

(10) Patent No.: US 7,598,678 B2
(45) Date of Patent: Oct. 6, 2009

(54) LAMP LIGHTING APPARATUS

(75) Inventors: Shigeki Harada, Tokyo (JP); Taichiro Tamida, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 615 days.

(21) Appl. No.: 11/460,103

(22) Filed: Jul. 26, 2006

(65) Prior Publication Data
US 2007/0024207 A1   Feb. 1, 2007

(30) Foreign Application Priority Data
Jul. 27, 2005   (JP) .............................. 2005-217358

(51) Int. Cl.
*H05B 37/02* (2006.01)
(52) U.S. Cl. .................................... 315/224
(58) Field of Classification Search ................. 315/224, 315/291, 307, 174
See application file for complete search history.

(56) References Cited

U.S. PATENT DOCUMENTS

| 5,608,294 | A | 3/1997 | Derra et al. | |
|---|---|---|---|---|
| 6,232,725 | B1 * | 5/2001 | Derra et al. | 315/209 R |
| 6,448,713 | B1 * | 9/2002 | Farkas et al. | 315/291 |
| 6,573,691 | B2 * | 6/2003 | Ma et al. | 323/209 |
| 6,670,780 | B2 * | 12/2003 | Ono et al. | 315/291 |
| 6,943,503 | B2 * | 9/2005 | Ozasa et al. | 315/224 |

FOREIGN PATENT DOCUMENTS

JP   2004-39563   2/2004

* cited by examiner

*Primary Examiner*—Douglas W Owens
*Assistant Examiner*—Minh D A
(74) *Attorney, Agent, or Firm*—Oblon, Spivak, McClelland, Maier & Neustadt, L.L.P.

(57) ABSTRACT

A lamp lighting apparatus includes an arc spot movement detector (5) for monitoring an DC voltage Vb which is the bus voltage of an inverter (3), and for detecting a movement of an arc spot which appears before a lamp 1 enters a state where human beings can recognize a flicker of the lamp (1), and, when the arc spot movement detector (5) detects a movement of the arc spot, controls a switch (2a) of a DCDC converter (2) so as to suppress the movement of the arc spot.

16 Claims, 8 Drawing Sheets

(a)

(b)

LAMP LIGHTING APPARATUS

BACKGROUND OF THE INVENTION

1. Field of the Invention

The present invention relates to a lamp lighting apparatus which lights a discharge lamp, such as an HID (High Intensity Discharge) lamp, using, for example, a short arc discharge.

2. Description of Related Art

An HID lamp is used as a light source of a projection type picture display device (projection display) which modulates light according to image data using a light modulation device, such as an LCD or DMD, and projects the modulated light on the screen thereof so as to display the image. Among HID lamps, ultra-high pressure mercury lamps have a gap between the electrodes thereof which is the shortest (about 1 mm) one of the gaps of HID lamps. Therefore, they are widely used especially for a projection display which desires a point light source.

In an optical system of a projection display, since one certain point with the highest brightness in the arc discharge of the discharge lamp is transferred onto the screen, a change in the flux of light of the discharge lamp and a change in the shape of the arc discharge have a large influence on the brightness of the image projected onto the screen. Therefore, the stability of the shape of the arc discharge of the discharge lamp and flux of light is stringently demanded.

When the frequency of variations in the brightness of the image projected onto the screen becomes below a certain frequency band, the observer recognizes them as a flicker, and comes to feel displeasure. Thus the screen flickering is an issue in the performance of the display.

A phenomenon in which the shape of the arc discharge varies occurs when an arc spot which is a landing position of the arc on an electrode of the discharge lamp moves continuously on the electrode of the discharge lamp or when the arc spot jumps intermittently on the electrode of the discharge lamp. In order to prevent the occurrence of the flicker resulting from movements of the arc spot, a method of superimposing a current whose peak value is higher than a base current having a value which is specified by rated power on the base current for a fixed time period before the polarity of the lamp current is reversed so as to raise the lamp current and to stabilize the arc discharge has been developed (for example, refer to patent reference 1).

In this specification, the current superimposed on the base current is referred to as "superimposed current pulse", and this method of stabilizing the arc discharge is referred to as "superimposed current pulse lighting method." The superimposed current pulse lighting method has a great effect of suppressing flickers. Nowadays, it is therefore adopted standardly to light an ultra-high pressure mercury lamp for use in a projection display.

However, a problem with the use of the superimposed current pulse lighting method is that the life of the discharge lamp is reduced. When the discharge lamp reaches the end of its life, the voltage (lamp voltage) across the electrodes of the lamp at the time when an electric discharge occurs becomes higher than a nominal voltage which is determined from the capability of the lighting circuit. It can be considered that the reason why such a phenomenon occurs is because the superimposed current pulse supplies energy more than necessary to the electrodes of the lamp momentarily, and this results in wear in the electrodes and a gap of a certain length or more between the electrodes.

Light generated by the superimposed current pulse does not contribute to the brightness of the image projected onto the screen. In other words, in an LCD, a DMD, or the like which is a light modulation device for use in a projection display, since it is easy to control the gray-scale of the image by making a flux of light which does not vary with time be incident upon the light modulation device, the light generated by the superimposed current pulse is intercepted while be incident upon the above-mentioned light modulation device at the time when the superimposed current pulse is applied to the lamp. As a result, there is a problem that the appliance of the superimposed current pulse reduces the luminous efficiency of the projection display.

These problems are brought to the fore when the superimposed current pulse is constantly applied to the lamp regardless of whether or not there occurs a flicker in the display. Therefore, an appliance of the superimposed current pulse on an as-needed basis reduces the above-mentioned problem. However, an appliance of the superimposed current pulse on an as-needed basis needs a means for detecting occurrence of a flicker which is an optical phenomenon. For example, a method of detecting, as an electric parameter, a change in the shape of an arc which can be assumed to be the same phenomenon as a flicker, and controlling the change is disclosed by the following patent reference 2.

[Patent reference 1] Derra et al., U.S. Pat. No. 5,608,294

[Patent reference 2] JP,2004-39563,A

A problem with prior art lamp lighting apparatus constructed as mentioned above is that while they can control occurrence of flickers by simply applying a superimposed current pulse to a discharge lamp after detecting occurrence of a flicker without causing a large reduction in the life of the discharge lamp, they cannot apply a superimposed current pulse to the discharge lamp when not detecting occurrence of a flicker, and therefore cannot suppress occurrence of flickers completely.

SUMMARY OF THE INVENTION

The present invention is made in order to solve the above-mentioned problems, and it is therefore an object of the present invention to provide a lamp lighting apparatus which can prevent occurrence of a flicker without causing a large reduction in the life of a discharge lamp disposed therein.

In accordance with the present invention, there is provided a lamp lighting apparatus including an arc spot movement detecting means for monitoring an electric parameter of a lamp light means so as to detect a movement of an arc spot lying within a band of frequencies higher than a critical flicker frequency, and an arc spot movement suppressing means for, when the arc spot movement detecting means detects a movement of the arc spot, controlling an AC rectangular wave applied to a discharge lamp by a lamp light means so as to perform a process of suppressing the movement of the arc spot.

Therefore, in accordance with the present invention, the occurrence of any flicker can be prevented without causing a large reduction in the life of the discharge lamp.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
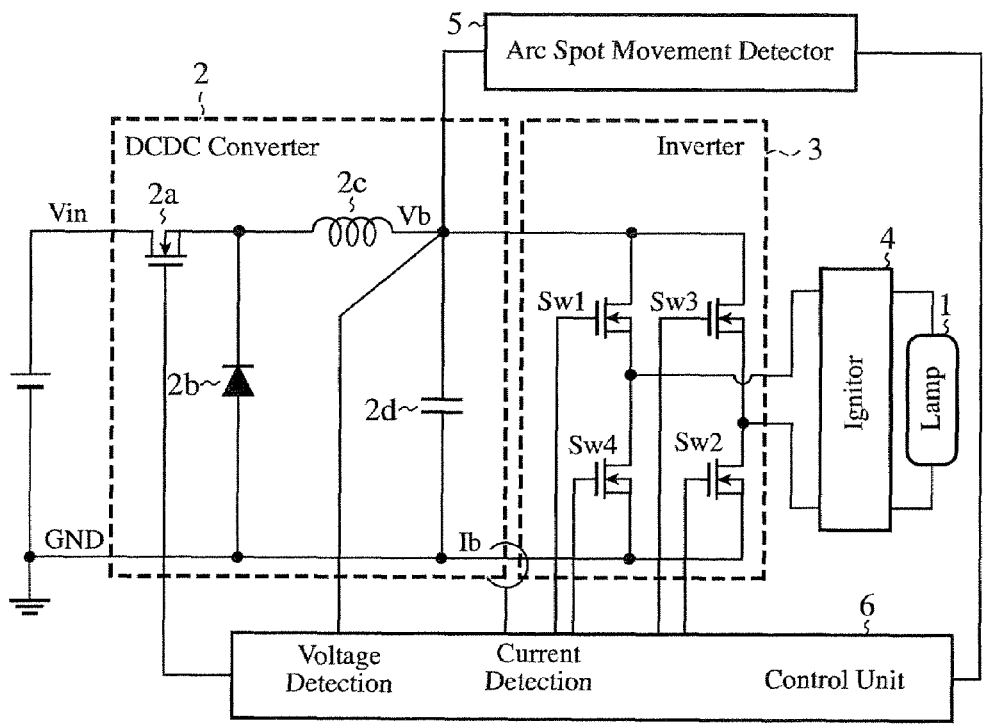
FIG. 1 is a block diagram showing a lamp lighting apparatus in accordance with embodiment 1 of the present invention.

FIG. 1 is a block diagram showing a lamp lighting apparatus and a lamp in accordance with embodiment 1 of the present invention. In the figure, the lamp 1 is a discharge lamp, such as an ultra-high pressure mercury lamp. In accordance with this embodiment 1, the lamp 1 is an ultra-high pressure mercury lamp having a lamp voltage of 80V, a lamp current of 1.5 A, and a power rating of 120 W.

A DCDC converter 2 is a step-down chopper provided with a switch 2a, a diode 2b, a coil 2c, and a capacitor 2d. When a DC voltage Vin (which is obtained by full-wave rectifying a commercial AC voltage to a DC voltage and then raising this DC voltage) is applied, the DCDC converter 2 converts the DC voltage Vin into a predetermined DC voltage Vb.

An inverter 3 is a full bridge inverter provided with switches SW1 to SW4. The inverter 3 converts the DC voltage Vb into which the DC voltage Vin is converted by the DCDC converter 2 into a 100 Hz AC rectangular wave, and applies the AC rectangular wave to both electrodes of the lamp 1. Here, it is assumed that the DC voltage Vin is 380V and the DC voltage Vb is 80V while the lamp discharges in a steady state.

An ignitor 4 is connected between the inverter 3 and the lamp 1 to initially ignite the lamp 1, and applies a short-pulse high-peak voltage to both the electrodes of the lamp 1 when initially igniting the lamp 1. The voltage generated by the ignitor 4 is typically 15 kV.

A lamp light means includes the DCDC converter 2, inverter 3, and ignitor 4.

An arc spot movement detector 5 carries out a process of monitoring the DC voltage Vb (or a current Ib which flows through the bus line of the inverter 3) which is the bus voltage of the inverter 3, and detecting a movement of an arc spot which appears before the lamp enters a state where human beings can recognize a flicker which occurs in the lamp 1. The arc spot movement detector 5 constitutes an arc spot movement detecting means.

A control unit 6 calculates the power applied to the lamp by detecting the DC voltage Vb and current Ib, and controls either the switch 2a of the DCDC converter 2 or the switches SW1 to SW4 of the inverter 3 so that the power is held at the rating power of 120 W. Furthermore, when the arc spot movement detector 5 detects a movement of the arc spot, the control unit 6 controls the switch 2a of the DCDC converter 2 (carries out a control process of raising the switching frequency of the switch 2a, or a control process of raising the duty of the switch 2a), and raises the current which flows into the lamp 1 during a fixed time period (or executes a superimposed current pulse lighting method), so as to suppress the movement of the arc spot. When the arc spot movement detector 5 detects disappearance of the movement of the arc spot, the control unit 6 stops the process of suppressing the movement of the arc spot. The control unit 6 constitutes an arc spot movement suppressing means.

In the example of FIG. 1, the arc spot movement detector 5 and control unit 6 detect the DC voltage Vb which is the bus voltage of the inverter 3. It is preferable to measure the voltage across the ends of the lamp directly in order to detect a change in the electric discharge including variations in the movement of the arc spot as sensitively as possible. However, in a circuit provided with an ignitor for generating a high voltage at a time of initially igniting a lamp, such as a lighting circuit for use with an HID lamp, a high-voltage elements needed in order to measure the voltage across the ends of the lamp directly. Therefore, it is preferable to detect a voltage which appears at a location to which the high voltage generated by the ignitor 4 is not applied directly.

The lamp lighting means provided with the DCDC converter 2, inverter 3, and ignitor 4 is the so-called "power supply", and the lamp 1 is the "load." Although the power supply should supply stable power ideally and should not be influenced by any change in the load, the capacity of the power supply is actually limited, the power supply and the load are on an equal footing with each other so that they have an influence on each other, and hence the power supply is always influenced by the load in some way. Therefore, information about change in the electric discharge can be acquired by monitoring the electric parameter of the lamp light means without directly measuring the electric parameter of the lamp.

Although there can be provided some locations in the lamp light means where the electric parameter can be monitored, it is to be noted that the DC voltage Vb which is the bus voltage of the inverter 3 represents the information about the lamp voltage correctly since the high voltage generated by the ignitor 4 is not applied to the bus line of the inverter 3 and the bus line of the inverter 3 is close to the lamp 1. Furthermore, since the DC voltage Vb is a DC potential, it is easy to detect the DC voltage Vb. Therefore, the DC voltage Vb is suitable for being detected as the lamp voltage.

Figure 2:
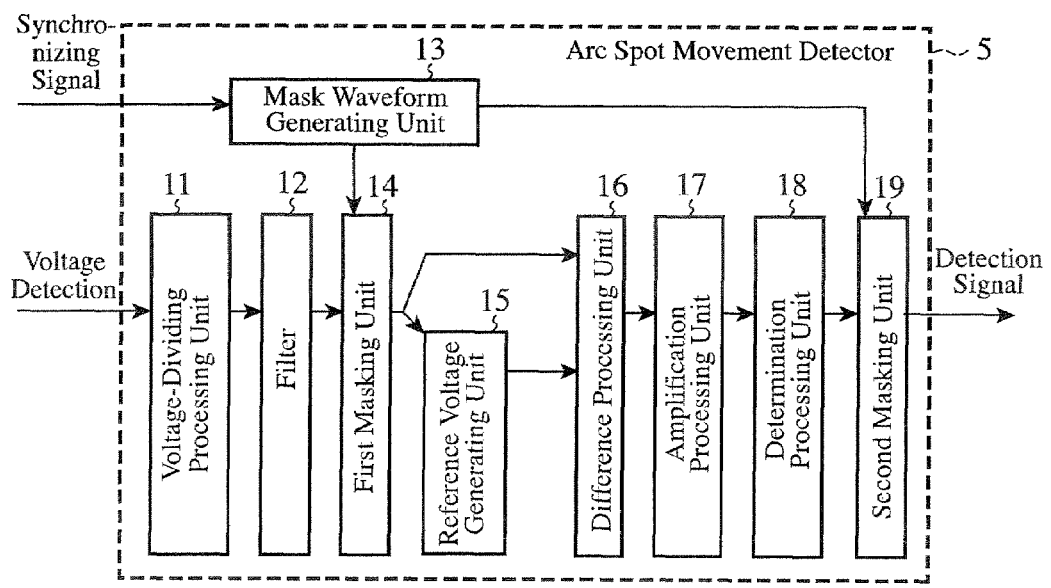
FIG. 2 is a block diagram showing an arc spot movement detector of the lamp lighting apparatus in accordance with embodiment 1 of the present invention.

FIG. 2 is a block diagram showing the arc spot movement detector 5 of the lamp lighting apparatus in accordance with embodiment 1 of the present invention. In the figure, in order to enable the arc spot movement detector to handle the DC voltage Vb which is the bus voltage of the inverter 3 in a signal level, a voltage dividing processing unit 11 carries out a process of lowering the DC voltage Vb which is the bus voltage of the inverter 3 in proportion to a specific voltage by, for example, dividing the DC voltage Vb with resistors.

A filter 12 is provided with an integrating circuit which consists of, for example, a resistor and a capacitor, and removes noises (for example, an overshoot and a ringing which occur each time when the polarity of the lamp voltage is reversed, and a high frequency component resulting from the switching of the DCDC converter 2) which are superimposed on the DC voltage lowered by the voltage dividing processing unit 11. The time constant of the integrating circuit in the filter 12 is so set that information about variations in the movement of the arc spot which appears before the lamp 1 enters a state where human beings can recognize a flicker of the lamp 1 cannot be removed, while information about the superimposed current pulse cannot be removed and therefore can remain automatically.

A mask waveform generating unit 13 generates a mask wave on the basis of a synchronizing signal acquired from the switching time of the inverter 3 in order to enable the arc spot movement detector to remove voltage fluctuations (for example, voltage fluctuations associated with the superimposed current pulse) which cannot be removed by the filter 12. The mask wave generated by the mask waveform generating unit 13 has a predetermined width, and is synchronized with time intervals of one half the lighting period of the lamp 1. In order to avoid erroneous detection of movements of the arc spot, it is desirable to set the width of the mask wave such that its rising edge slightly goes forward before the superimposed current pulse and its falling edge slightly goes backward behind the superimposed current pulse. The mask wave can be generated by a combination of a flip-flop and a simple logic circuit in synchronization with a clock signal.

A first masking unit 14 carries out a process of removing voltage fluctuations and so on associated with the superimposed current pulse which cannot be removed by the filter 12 using the mask wave generated by the mask waveform generating unit 13. Since a voltage signal outputted from the filter 12 is analog data, the first masking unit 14 carries out a process of interpolating a portion which is removed with the masking. For example, using a sample hold IC, a voltage signal which is inputted immediately before the mask wave is inputted is held and outputted without outputting a voltage signal inputted while the mask wave is inputted.

A reference voltage generating unit 15 carries out a process of storing the voltage signal outputted from the first masking unit 14, calculating the average of the voltage signals which have been previously stored therein, and outputting the average as a reference waveform. Although variations in the lamp voltage usually vary with time in a long span of time which is of order of several days or several months as the lamp reaches the end of its life, the lamp voltage may vary in a short span of time which is of order of minutes under the influence of, for example, the halogen cycle in some cases. Therefore, the reference voltage generating unit 15 uses an integrating circuit which consists of a resistor and a capacitor in order to generate a reference voltage which includes information about relatively-long-term variations in the lamp voltage. The time constant of the integrating circuit in the reference voltage generating unit 15 is so set that information about variations in the movement of the arc spot which appears before the lamp 1 enters a state where human beings can recognize a flicker of the lamp 1 can be removed, while information about variations in the lamp voltage which vary with time in a relatively-long span of time which is of order of minutes or more cannot be removed and therefore can remain. For example, the time constant can be of order of 1 second to 10 seconds.

A difference processing unit 16 determines the difference between the voltage signal outputted from the first masking unit 14 and the reference waveform generated by the reference voltage generating unit 15, and carries out a process of outputting the difference value. An amplification processing unit 17 carries out a process of amplifying the difference value outputted from the difference processing unit 16. Fundamentally, only the information about variations in the movement of the arc spot which appears before the lamp 1 enters a state where human beings can recognize a flicker of the lamp 1 is included in the difference value which is amplified by the amplification processing unit 17.

A determination processing unit 18 includes a comparator and soon, and compares the amplified difference value outputted from the amplification processing unit 17 with a predetermined threshold so as to determine whether the difference value indicates a movement of the arc spot which appears before the lamp 1 enters a state where human beings can recognize a flicker of the lamp 1, and, when determining that the difference value indicates a movement of the arc spot, outputs a detection signal indicating detection of the movement of the arc spot. In this case, when the difference value outputted from the difference processing unit 16 is larger than the predetermined threshold, the determination processing unit determines that the difference value indicates a movement of the arc spot. However, when the threshold is too small, the determination processing unit may result in an erroneous determination under the influence of noises superimposed on the voltage signal, whereas when the threshold is too large, the arc spot movement detector may be unable to detect any movement of the arc spot before the lamp 1 enters a state where human beings can recognize a flicker of the lamp 1. Therefore, it is necessary to set the predetermined threshold to a proper value, and, when the predetermined threshold is set to a proper value, the arc spot movement detector can detect a movement of the arc spot without picking up any noise before it grows into a flicker.

A second masking unit 19 carries out a process of removing the detection signal outputted from the determination processing unit 18 using the mask wave generated by the mask waveform generating unit 13 when the detection signal is inputted thereto as a result of input of voltage fluctuations caused by the superimposed current pulse to the arc spot movement detector.

In the example of FIG. 2, both the first masking unit 14 and the second masking unit 19 are disposed in the arc spot movement detector in order to remove unnecessary information certainly. As an alternative, either the first masking unit 14 or the second masking unit 19 can be disposed in the arc spot movement detector.

Next, the operation of the lamp lighting apparatus in accordance with this embodiment of the present invention will be explained.

The cause of the occurrence of a flicker is a movement of the arc spot on the electrodes, as mentioned above. However, strictly speaking, the physical phenomenon in which the arc spot moves on the electrodes is not the same as a flicker which human beings can sense at all. A flicker which can make a human being sense that the brightness varies is a result which is acquired through a filter which is the human being's eyes and brain. At that time, since information about variations of more than a certain frequency in the brightness is integrated by the human being's eyes and brain, it does not cause the human being to sense that the brightness varies. The highest frequency at which human beings can sense flickers in a flickering light source is called a critical flicker frequency.

Although there is variations among individuals in this critical flicker frequency, Lighting Handbook (edited by Illuminating Engineering Institute of Japan, Ohm-Sha Ltd., p 251) notes that human beings cannot sense variations in the brightness of a frequency of 70 Hz or more as a flicker. In PAL which is a television system, the frame frequency is set to 50 Hz so that human beings cannot sense any flicker.

In consideration of the fact that a flicker which is a result acquired through a filter which is a human being's eyes and brain differs from the pure physical phenomenon in which the arc spot moves on the electrodes, the pure physical phenomenon in which the arc spot moves on the electrodes can be divided into two modes as follows. In one of the two modes, a movement of the arc spot occurs at the critical flicker frequency or less at which human beings can sense a flicker. Hereafter, such a movement is referred to as "flicker synchronized arc spot movement", for the sake of convenience. In the other mode, a movement of the arc spot occurs at more than the critical flicker frequency at which human beings can sense a flicker. Hereafter, such a movement is referred to as "flicker non-synchronized arc spot movement", for the sake of convenience.

Figure 3:
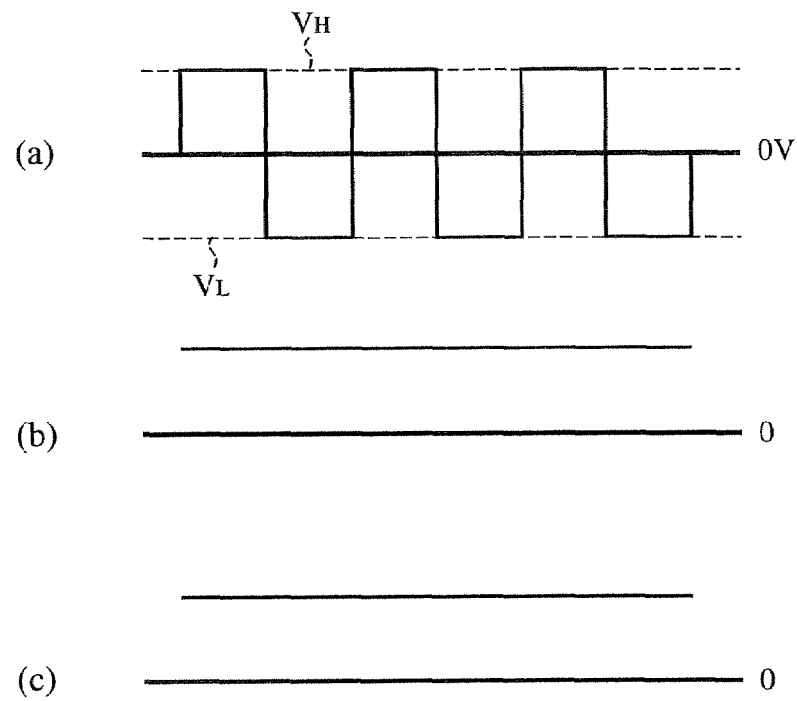
FIG. 3 is an explanatory diagram showing a normal state in which no movement of an arc spot occurs.
Figure 4:
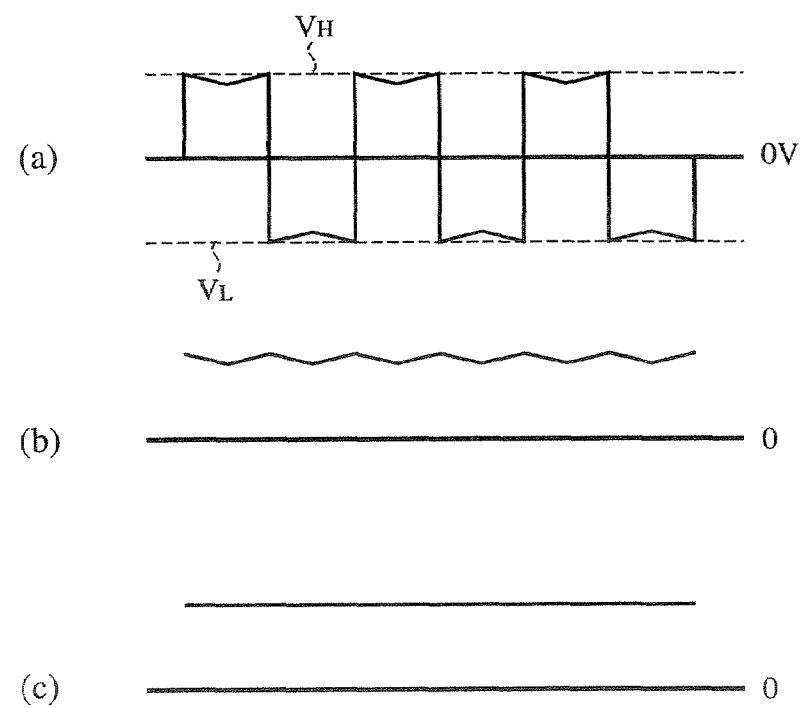
FIG. 4 is an explanatory diagram showing a state where an arc spot movement synchronized with a flicker occurs.
Figure 5:
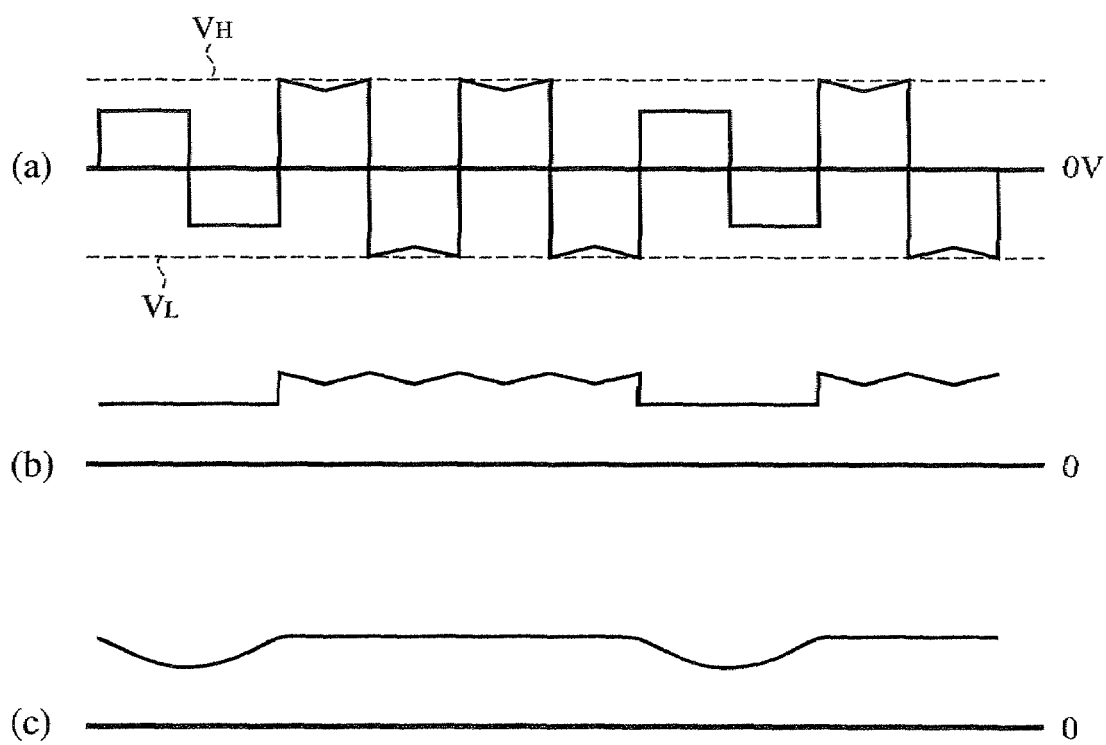
FIG. 5 is an explanatory diagram showing a state where an arc spot movement synchronized with a flicker occurs.

In each of FIGS. 3 to 5, (a) is an explanatory diagram showing the lamp voltage, and (b) is an explanatory diagram showing the light intensity at a fixed point in the vicinity of an electrode of the lamp, and (c) is an explanatory diagram showing the brightness of the light which has passed through a filter which is a human being's eyes. Assume that the lamp 1 lights up at a frequency of, for example, 100 Hz (i.e., the lamp is placed in a state which its polarity is reversed at a frequency of 200 Hz).

Especially, FIG. 3 shows a normal state where no movement of the arc spot occurs. In this state, the lamp voltage is held at a normal and fixed voltage value VH or VL which is determined by given power during each half cycle (see FIG. 3(a)), and the light intensity in the vicinity of the electrodes does not vary during each half cycle (see FIG. 3(b)). In this sate, human beings do not sense variations in the brightness as a matter of course (see FIG. 3(c)).

FIG. 4 shows a state where a flicker non-synchronized arc spot movement occurs. The voltage waveform varies very slightly during each half cycle (see FIG. 4(a)), and the light intensity in the vicinity of the electrodes also varies as the voltage wave form varies (see FIG. 4(b)). However, in this case, since variations in the brightness during each half cycle occur in a short span of time, human beings cannot sense them. Even if variations in the brightness during each half cycle occur periodically at a frequency of 200 Hz, as shown in the figure, human beings cannot sense them (see FIG. 4(c)).

FIG. 5 shows a state where a flicker synchronized arc spot movement occurs. In this state, variations in the lamp voltage are larger than those in the case of FIG. 4, and they continue throughout more than half cycle (see FIG. 5(a)). The light intensity in the vicinity of the electrodes also varies as the voltage waveform varies (see FIG. 5(b)), and variations in the brightness remain after passing through a human being's filter (see FIG. 5(c)).

Conventionally, there haven't been provided an example in which a flicker non-synchronized arc spot movement is handled, as previously mentioned, and an example in which a flicker non-synchronized arc spot movement is detected in order to control a flicker. There are the following two reasons for this.

The first lies in a measurement reason. Variations in the lamp voltage and variations in the current due to a flicker non-synchronized arc spot movement are very small, and a percentage of variations in the peak value may be 1% or less. A period of time during which such variations occur is one half the lighting period of the lamp. For example, variations in the lamp voltage and variations in the current occur and then disappear during a time period of 5 msec or less.

There has been no idea that there is a possibility that the arc spot is moving even when no flicker occurs, and it is therefore difficult to catch such a phenomenon unless there is a willingness to try to observe such small variations. Thus, it can be considered that the difficulty of observation of a flicker non-synchronized arc spot movement and indifference to such a phenomenon make it difficult to discover a flicker non-synchronized arc spot movement.

The second lies in a detection reason. Although it is possible to observe a flicker non-synchronized arc spot movement if it is apparent that such a phenomenon can occur, it is difficult to detect a flicker non-synchronized arc spot movement easily for the following reason. Some variations in the voltage and some variations in the current, as well as variations in the electric parameter due to a flicker non-synchronized arc spot movement, can be seen in a span of time corresponding to the lighting period (the lighting frequency) of the lamp 1. Especially, variations in the superimposed current pulse occur most remarkably. Therefore, even when the superimposed current pulse is applied, detection of variations in the electric parameter due to a movement of the arc spot must be carried out correctly.

Figure 6:
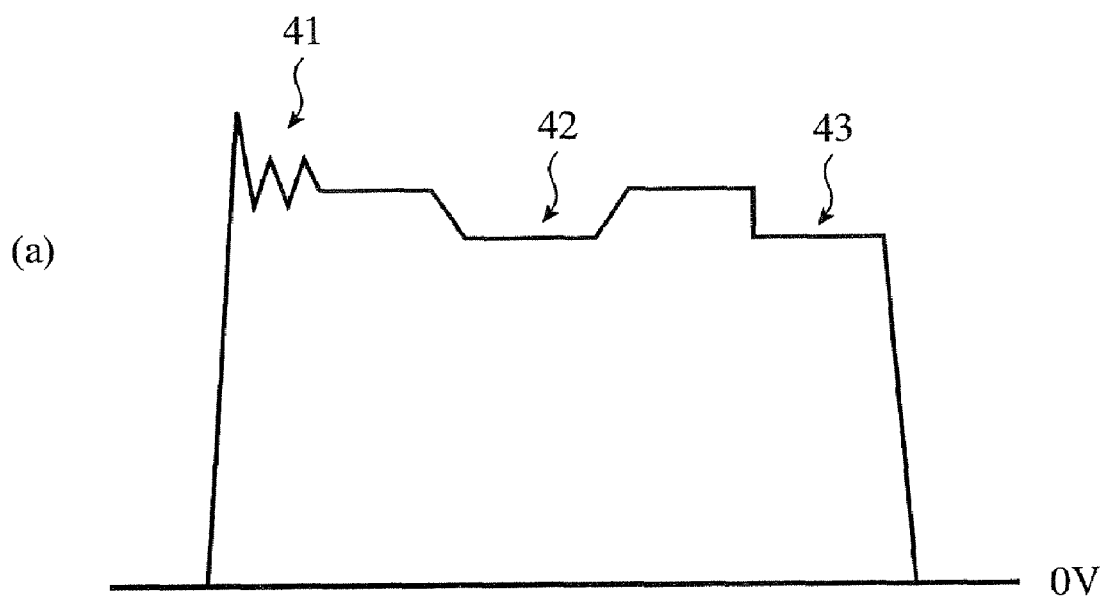
FIG. 6 is an explanatory diagram showing the time order of the lighting frequency of a lamp (e.g., changes in of a voltage and a current which can occur within a half of the lighting period of the lamp)
Figure 6:
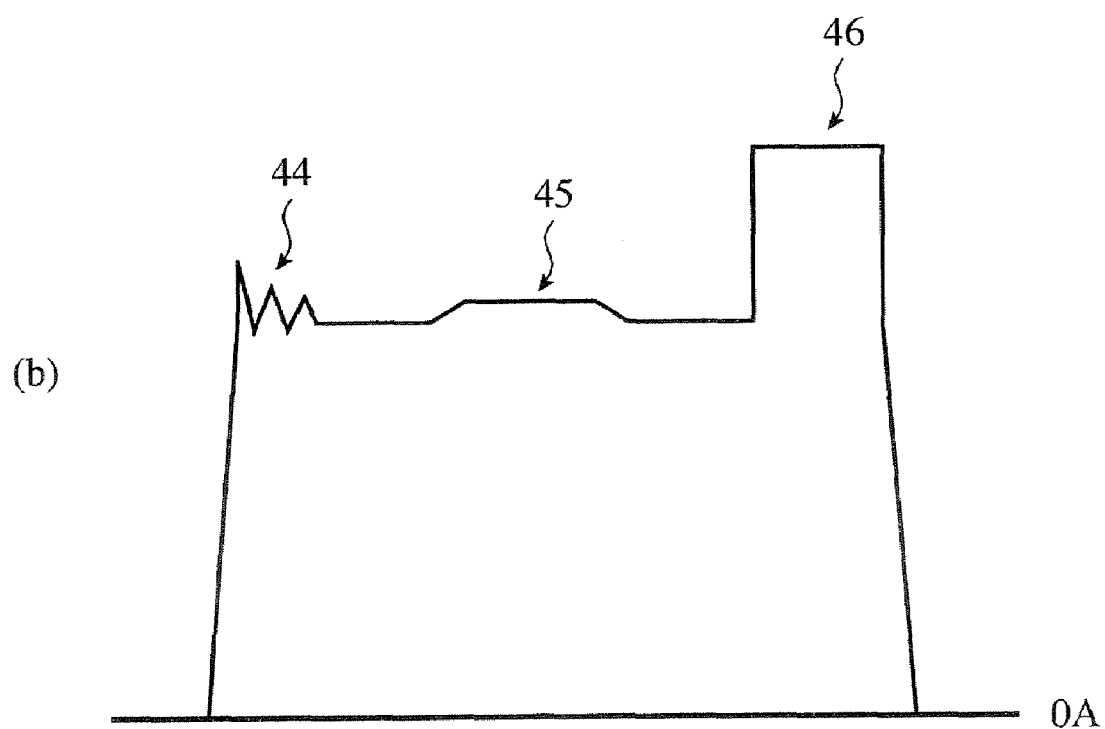

FIG. 6 is an explanatory diagram showing variations in the voltage and variations in the current which can occur in a span of time corresponding to the lighting period of the lamp 1, i.e., during each half cycle of the lamp 1. FIG. 6(a) shows a lamp voltage wave in each half cycle. In the figure, 41 denotes variations in the voltage due to an overshoot and a ringing upon a pulse rising, which are caused by the impedance of the circuit, 42 denotes variations in the voltage due to a flicker non-synchronized arc movement, and 43 denotes variations in the voltage due to the superimposed current pulse. FIG. 6(b) shows a lamp current wave in each half cycle. In the figure, 44 denotes variations in the current due to an overshoot and a ringing upon a pulse rising, which are caused by the impedance of the circuit, 45 denotes variations in the current due to a flicker non-synchronized arc movement, and 46 denotes variations in the current due to the superimposed current pulse.

Since the frequency band of variations due to an overshoot and a ringing is higher than the frequency band of variations due to a flicker non-synchronized arc movement and that of variations due to the superimposed current pulse, the variations due to an overshoot and a ringing can be removed easily by using an integrating circuit which consists of a resistor and a capacitor. On the other hand, since the frequency band of variations due to a flicker non-synchronized arc movement is much the same as that of variations due to the superimposed current pulse, only the desired information cannot be detected by using only a simple circuit which consists of a simple integrating circuit and a comparison circuit.

Thus, it is of significant importance to detect a flicker non-synchronized arc spot movement which is difficult to detect as an electric parameter. In our investigation, a flicker non-synchronized arc spot movement will grow into a flicker synchronized arc spot movement and will cause a flicker. This is because, although in consideration of the fact that a flicker which is a result acquired through a filter which is a human being's eyes and brain differs from the pure physical phenomenon in which the arc spot moves on the electrodes, the pure physical phenomenon in which the arc spot moves on the electrodes can be divide into the two modes: a flicker synchronized arc spot movement and a flicker non-synchronized arc spot movement, for the sake of convenience, these modes can be assumed to be aspects of fundamentally the same physical phenomenon.

In other words, a flicker non-synchronized arc spot movement is a precursor of a flicker, and therefore detection of a flicker non-synchronized arc spot movement before a flicker occurs and then appliance of a superimposed current pulse to the lamp so as to suppress movements of the arc spot can prevent occurrence of any flicker.

Hereafter, a method of detecting and controlling a flicker non-synchronized arc spot movement in accordance with this embodiment will be explained concretely.

A DC voltage Vin which is obtained by full-wave rectifying a commercial AC voltage into a DC voltage and then raising it is applied to the DCDC converter 2. The DCDC converter 2 then converts the DC voltage Vin into a predetermined DC voltage Vb by making the switch 2a perform a switching operation according to an instruction from the control unit 6 when the DC voltage Vin is applied thereto.

The ignitor 4 is connected between the inverter 3 and the lamp 1 to initially ignite the lamp 1, and applies a short-pulse high-peak voltage to both the electrodes of the lamp 1 when initially igniting the lamp 1. The voltage generated by the ignitor 4 is typically 15 kV. The appliance of the high voltage to the lamp 1 by the ignitor 4 causes a dielectric breakdown between the electrodes of the lamp 1, and a subsequent appliance of an AC rectangular wave to the lamp 1 causes an arc discharge in the lamp.

When receiving the DC voltage Vb from the DCDC converter 2, the inverter 3 converts the DC voltage Vb into the 100 Hz AC rectangular wave by making the switches SW1 to SW4 perform switching operations according to an instruction from the control unit 6, and applies the AC rectangular wave to the both electrodes of the lamp 1. In this case, it is assumed that the DC voltage Vin is 380V and the DC voltage Vb is 80V while the lamp discharges in a steady state.

The frequency of the AC rectangular wave applied to the lamp 1 falls within a range of 100 Hz to 200 Hz in consideration of compatibility with a video signal. For example, in the case of NTSC, the frequency of the AC rectangular wave applied to the lamp 1 can be 120 Hz, 180 Hz, or the like which is multiple-times as high as 60 Hz. When the frequency of the AC rectangular wave is equal to or less than 60 Hz, the life of the lamp is reduced since the difference between the temperatures of the anode and cathode of the lamp during each half cycle becomes so large that the discharge characteristics of the lamp are affected. On the other hand, when the AC rectangular wave has a high frequency equal to or higher than 200 Hz, the frequency of a restriking voltage which occurs when the polarity of the lamp is reversed becomes high and the life of the lamp is reduced. For this reason, the AC rectangular wave rarely has a frequency of 60 Hz or less, or 200 Hz or more. Hereafter, it is assumed that the AC rectangular wave has a frequency of 100 Hz.

When the control unit 6 controls the DCDC converter 2 and inverter 3 in the above-mentioned way so as to start lighting the lamp 1, the arc spot movement detector 5 carries out a process of monitoring the DC voltage Vb which is the bus voltage of the inverter 3 so as to detect a movement of the arc spot which appears before the lamp enters a state where human beings can recognize a flicker which occurs in the lamp 1.

Although the monitoring of the DC voltage Vb which is the bus voltage of the inverter 3 will be explained hereafter, the current Ib which flows through the bus line of the inverter 3 can be alternatively monitored since the current Ib which flows through the bus line of the inverter 3 can include information about a movement of the arc spot when it varies, like the DC voltage Vb.

Specifically, the arc spot movement detector 5 detects a movement of the arc spot as follows.

The voltage-dividing processing unit 11 of the arc spot movement detector 5 carries out a process of lowering the DC voltage Vb which is the bus voltage of the inverter 3 in proportion to a specific voltage by, for example, dividing the DC voltage Vb with resistors, in order to enable the arc spot movement detector to handle the DC voltage Vb which is the bus voltage of the inverter 3 in a signal level. For example, the voltage-dividing processing unit 11 converts the DC voltage Vb which is the bus voltage of the inverter 3 into a voltage signal having a value falling within a range of 0 to 5V.

When receiving the voltage signal having a value falling within a range of 0 to 5V from the voltage-dividing processing unit 11, since, for example, high-frequency components which result from the switching of the DCDC converter 2, as well as an overshoot and a ringing which occur when the polarity of the lamp is reversed, are superimposed on the voltage signal, the filter 12 of the arc spot movement detector 5 removes the noises superimposed on the voltage signal from the voltage signal using, for example, an integrating circuit provided with a resistor and a capacitor.

The time constant of the integrating circuit in the filter 12 is so set that information about variations in the movement of the arc spot which appears before the lamp 1 enters a state where human beings can recognize a flicker of the lamp 1 cannot be removed, while information about the superimposed current pulse cannot be removed and therefore can remain automatically.

While the filter 12 removes the noises, as mentioned above, the mask waveform generating unit 13 of the arc spot movement detector 5 generates a mask wave on the basis of a synchronizing signal acquired from the switching time of the inverter 3 in order to enable the arc spot movement detector to remove voltage fluctuations (for example, voltage fluctuations associated with the superimposed current pulse) which cannot be removed by the filter 12.

Figure 7:
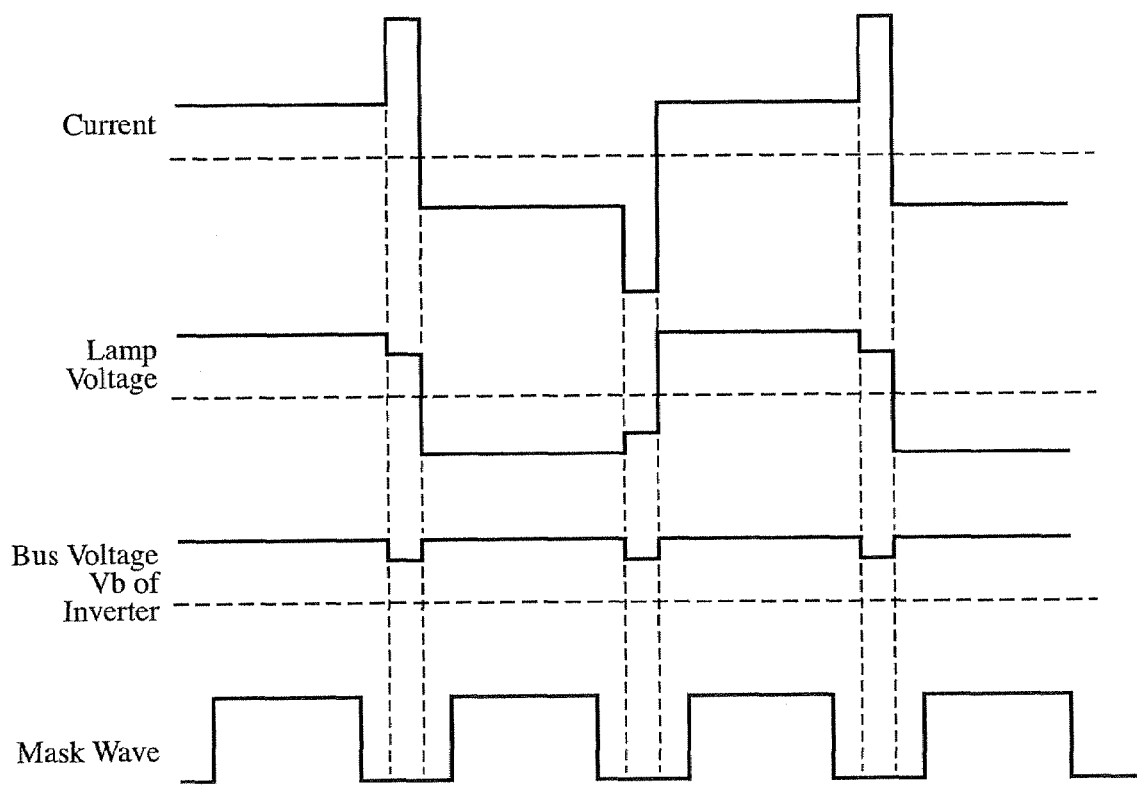
FIG. 7 is an explanatory diagram showing a mask wave generated by a mask waveform generating unit.

FIG. 7 is an explanatory diagram showing the mask wave generated by the mask waveform generating unit 13. As can be seen from FIG. 7, the mask wave generated by the mask waveform generating unit 13 has a predetermined width, and is synchronized with time intervals of one half the lighting period of the lamp 1.

In order to avoid erroneous detection of movements of the arc spot, it is desirable to set the width of the mask wave such that its rising edge slightly goes forward before the superimposed current pulse and its falling edge slightly goes backward behind the superimposed current pulse. The mask wave can be generated by a combination of a flip-flop and a simple logic circuit in synchronization with a clock signal.

When receiving the voltage signal outputted from the filter 1, the first masking unit 14 of the arc spot movement detector 5 carries out a process of removing voltage fluctuations and so on associated with the superimposed current pulse which cannot be removed by the filter 12 using the mask wave generated by the mask waveform generating unit 13. Since the voltage signal outputted from the filter 12 is analog data, the first masking unit 14 carries out a process of interpolating a portion which is removed with the masking. For example, using a sample hold IC, the voltage signal which is inputted immediately before the mask wave is inputted is held and outputted without outputting the voltage signal inputted while the mask wave is inputted.

Figure 8:
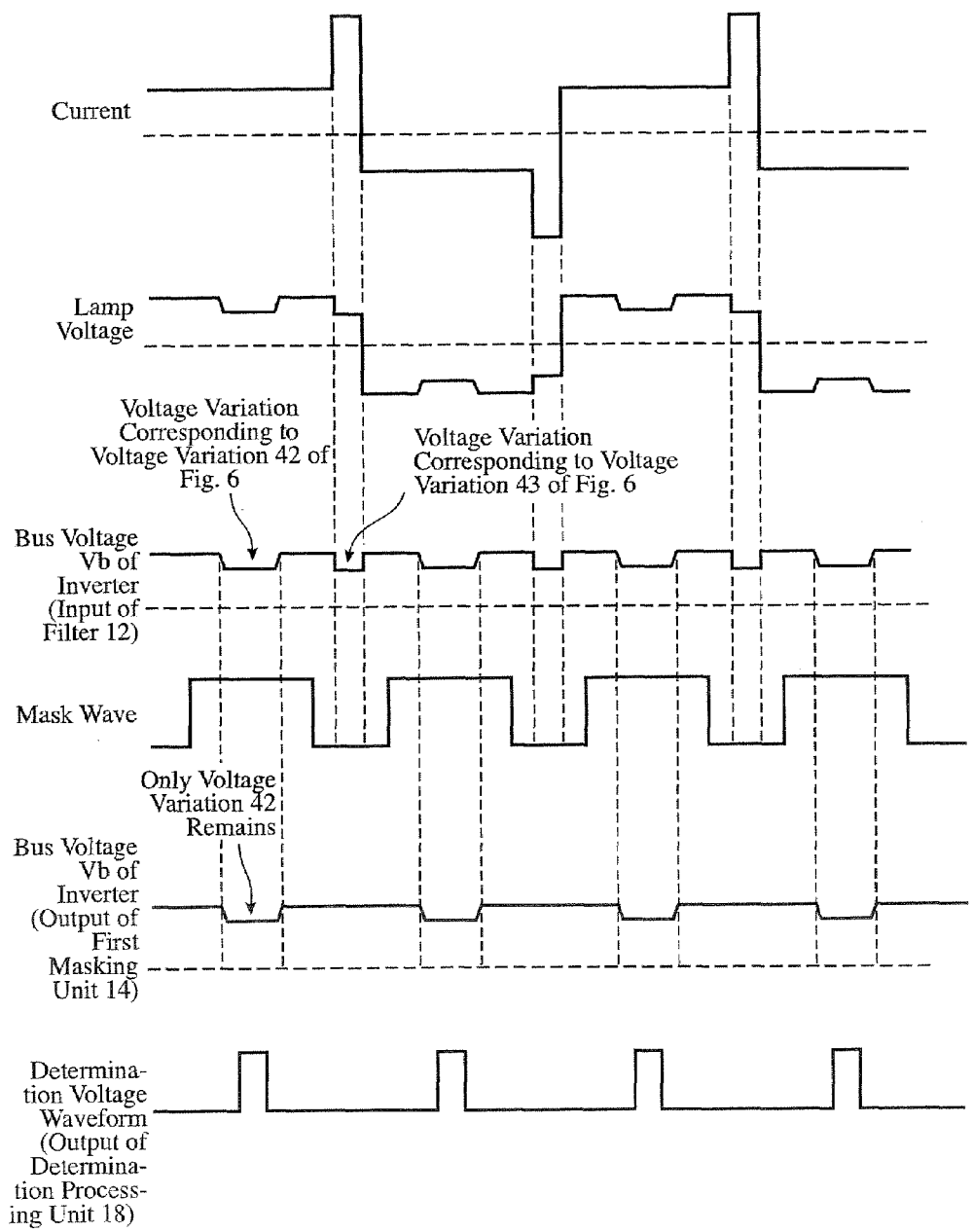
FIG. 8 is an explanatory diagram showing a masking result in a case where only a first masking unit is disposed in the arc spot movement detector (when a second masking unit is not disposed)

FIG. 8 is an explanatory diagram showing a masking result in a case where only the first masking unit 14 is disposed in the arc spot movement detector 5 (i.e., when no second masking unit 19 is disposed in the arc spot movement detector). In the example of FIG. 8, assuming a case where a voltage variation 42 due to a flicker non-synchronized arc movement of FIG. 6 and a voltage variation 43 due to the superimposed current pulse is superimposed on the voltage signal, the first masking unit 14 removes the voltage variation 43 due to the superimposed current pulse from the voltage signal.

When receiving the voltage signal in which the voltage variation 43 due to the superimposed current pulse has been removed from the first masking unit 14, the reference voltage generating unit 15 of the arc spot movement detector 5 stores the voltage signal in a memory thereof. The reference voltage generating unit 15 then carries out a process of calculating the average of the voltage signals which have been previously stored in the memory, and outputting the average as a reference waveform.

Although variations in the lamp voltage usually vary with time in a long span of time which is of order of several days or several months as the lamp reaches the end of its life, the lamp voltage may vary in a short span of time which is of order of minutes under the influence of, for example, the halogen cycle in some cases. Therefore, the reference voltage generating unit 15 uses an integrating circuit which consists of a resistor and a capacitor in order to generate a reference voltage which includes information about relatively-long-term variations in the lamp voltage. The time constant of the integrating circuit in the reference voltage generating unit 15 is so set that information about variations in the movement of the arc spot which appears before the lamp 1 enters a state where human beings can recognize a flicker of the lamp 1 can be removed, while information about variations in the lamp voltage which vary with time in a relatively-long span of time which is of order of minutes or more cannot be removed and therefore can remain. For example, the time constant can be of order of 1 second to 10 seconds.

In this case, the voltage signal outputted from the first masking unit 14 is stored in the memory, and the average of the voltage signals which have been previously stored in the memory is calculated, as previously mentioned. Instead of storing the voltage signal outputted from the first masking unit 14 in the memory, the reference voltage generating unit can furnish the voltage signal to the integrating circuit having a predetermined time constant, for example, and can use an output signal of the integrating circuit as a reference waveform.

When receiving the voltage signal in which the voltage variation 43 due to the superimposed current pulse has been removed from the first masking unit 14, and also receiving the reference waveform from the reference voltage generating unit 15, the difference processing unit 16 of the arc spot movement detector 5 determines the difference between the voltage signal and the reference waveform, and then outputs the difference value to the amplification processing unit 17. When receiving the difference value from the difference processing unit 16, the amplification processing unit 17 of the arc spot movement detector 5 amplifies the difference value, and then outputs the amplified difference value to the determination processing unit 18.

Fundamentally, only the information about variations in the movement of the arc spot which appears before the lamp 1 enters a state where human beings can recognize a flicker of the lamp 1 is included in the difference value which is amplified by the amplification processing unit 17. The variation information about variations in the voltage due to the superimposed current pulse is removed from the voltage signal by the first masking unit 14. However, the variation information may remain in the voltage signal without being removed completely. In this case, the second masking unit 19 located behind the first masking unit removes the variation information about variations in the voltage due to the superimposed current pulse from the voltage signal.

When receiving the amplified difference value from the amplification processing unit 17, the determination processing unit 18 of the arc spot movement detector 5 compares the difference value with the predetermined threshold so as to determine whether the difference value indicates a movement of the arc spot which appears before the lamp 1 enters a state where human beings can recognize a flicker of the lamp 1, and, when determining that the difference value indicates a movement of the arc spot, outputs a detection signal indicating detection of a movement of the arc spot to the second masking unit 19.

In this case, when the difference value outputted from the difference processing unit 16 is larger than the predetermined threshold, the determination processing unit determines that the difference value indicates a movement of the arc spot. However, when the threshold is too small, the determination processing unit may result in an erroneous determination under the influence of noises superimposed on the voltage signal, whereas when the threshold is too large, the arc spot movement detector may be unable to detect any movement of the arc spot before the lamp 1 enters a state where human beings can recognize a flicker of the lamp 1. Therefore, it is necessary to set the predetermined threshold to a proper value, and, when the predetermined threshold is set to a proper value, the arc spot movement detector can detect a movement of the arc spot without picking up any noise before it grows into a flicker.

When receiving the detection signal from the determination processing unit 18, since it is determined that the detection signal is generated by virtue of an erroneous detection when the detection signal is outputted according to an input of variations in the voltage due to the superimposed current pulse, the second masking unit 19 of the arc spot movement detector 5 carries out a process of removing the detection signal which is generated by virtue of an erroneous detection and which is outputted from the determination processing unit 18 using the mask wave generated by the mask waveform generating unit 13.

Figure 9:
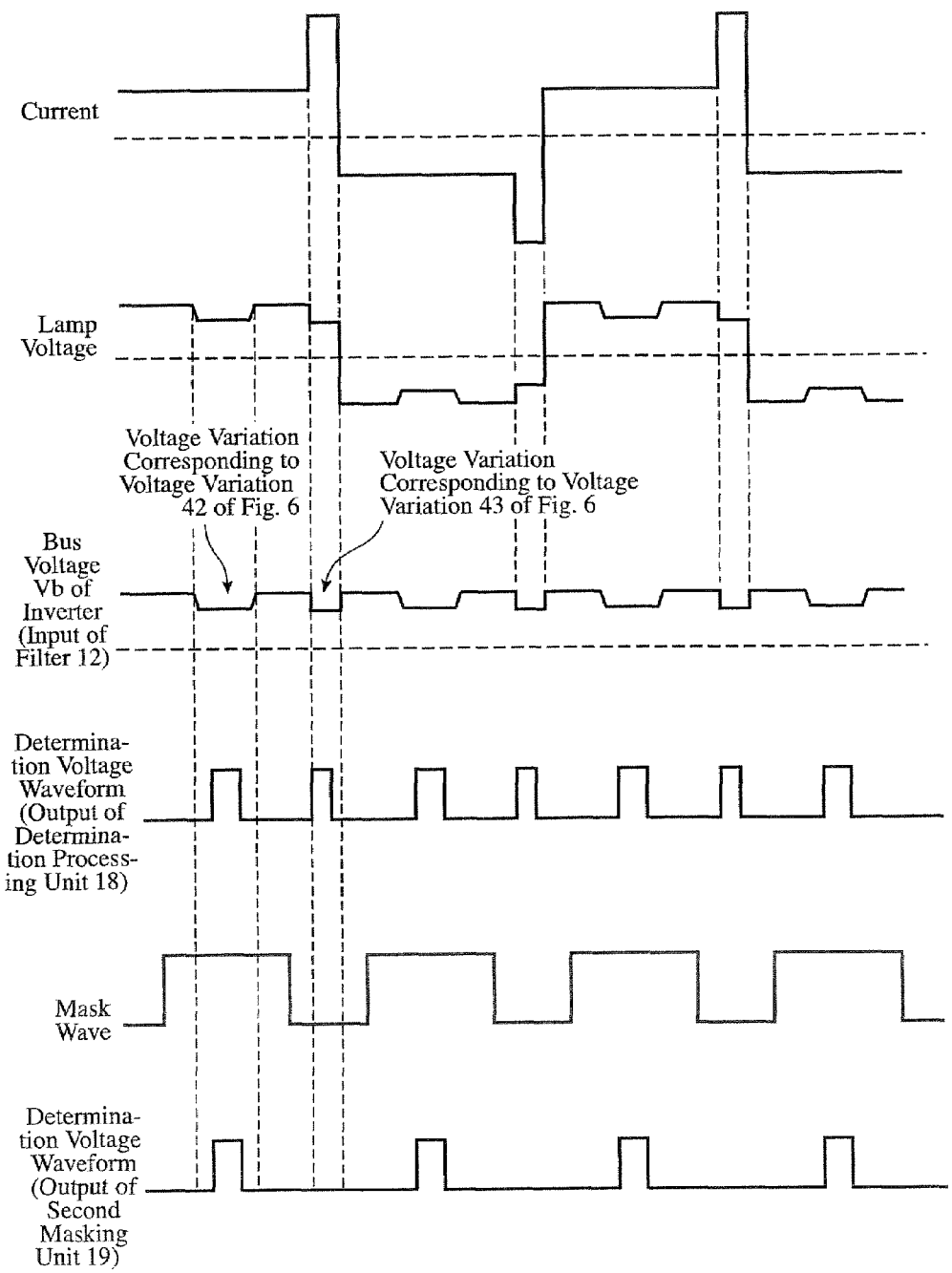
FIG. 9 is an explanatory diagram showing a masking result in a case where only the second masking unit is disposed in the arc spot movement detector (when the first masking unit is not disposed)

FIG. 9 is an explanatory diagram showing a masking result in a case where only the second masking unit 19 is disposed in the arc spot movement detector 5 (i.e., when no first masking unit 14 is disposed in the arc spot movement detector). In the example of FIG. 9, assuming a case where a voltage variation 42 due to a flicker non-synchronized arc movement of FIG. 6 and a voltage variation 43 due to the superimposed current pulse are superimposed on the voltage signal, the first masking unit 14 removes the detection signal which is generated by virtue of an erroneous detection and which is outputted from the determination processing unit 18.

When the arc spot movement detector 5 detects a movement of the arc spot, and the control unit receives the detection signal from the arc spot movement detector 5, the control unit 6 controls the switch 2a of the DCDC converter 2 (carries out a control process of raising the switching frequency of the switch 2a, or a control process of raising the duty of the switch 2a) during a fixed time period before the polarity of the lamp 1 is reversed to raise the current which flows into the lamp 1 during the fixed time period (executes a superimposed current pulse lighting method) so that the movement of the arc spot can be suppressed.

When the arc spot movement detector 5 detects disappearance of the movement of the arc spot and then negates the detection signal, the control unit 6 stops the execution of the superimposed current pulse lighting method (returns the switch 2a of the DCDC converter 2 to a previous state in which it was placed before the movement of the arc spot has been suppressed), and stops the process of suppressing the movement of the arc spot.

At the same time when receiving the detection signal from the arc spot movement detector 5, the control unit 6 can execute the superimposed current pulse lighting method. As an alternative, after a lapse of a predetermined time interval after receiving the detection signal from the arc spot movement detector 5, the control unit 6 can execute the superimposed current pulse lighting method. For example, after receiving the detection signal from the arc spot movement detector 5 a number of times, or after the frequency of the detection signal from the arc spot movement detector 5 becomes equal to or higher than a constant frequency, the control unit 6 can execute the superimposed current pulse lighting method.

At the same time when not receiving the detection signal from the arc spot movement detector 5, the control unit 6 can stop executing the superimposed current pulse lighting method. As an alternative, after a lapse of a predetermined time interval after not receiving the detection signal from the arc spot movement detector 5, the control unit 6 can stop executing the superimposed current pulse lighting method. The width of the detection signal shows the amount of the voltage variations, and the number of times that the detection signal is generated shows the frequency of occurrence of the voltage variations. In other words, the number of times that the detection signal is generated shows the intensity of movements of the arc spot. It is therefore possible to control the superimposed current pulse more efficiently by changing the width and peak value of the superimposed current pulse according to the width of the detection signal and the number of times that the detection signal is generated.

As can be seen from the above description, the lamp lighting apparatus in accordance with this embodiment 1 includes the arc spot movement detector 5 for monitoring the DC voltage Vb which is the bus voltage of the inverter 3, and for detecting a movement of the arc spot which appears before the lamp 1 enters a state in which human beings can recognize a flicker of the lamp 1, and, when the arc spot movement detector 5 detects a movement of the arc spot, controls the switch 2a of the DCDC converter 2 so as to suppress the movement of the arc spot. Therefore the occurrence of any flicker can be prevented without causing a large reduction in the life of the lamp 1.

Furthermore, since the lamp lighting apparatus in accordance with this embodiment 1 stops the process of suppressing the movement of the arc spot when not receiving the detection signal from the arc spot movement detector 5, a reduction in the life of the lamp 1 can be prevented.

In addition, since the lamp lighting apparatus in accordance with this embodiment 1 carries out the process of raising the current which flows into the lamp 1 during a fixed time interval before the polarity of the lamp 1 is reversed so as to suppress the movement of the arc spot when receiving the detection signal from the arc spot movement detector 5, the arc discharge of the lamp can be stabilized and the occurrence of any flicker can be prevented.

Furthermore, since the lamp lighting apparatus in accordance with this embodiment 1 starts the process of suppressing the movement of the arc spot at the same time when receiving the detection signal from the arc spot movement detector 5, the movement of the arc spot can be suppressed surely.

In addition, since the lamp lighting apparatus in accordance with this embodiment 1 starts the process of suppressing the movement of the arc spot after a lapse of a predetermined time interval after receiving the detection signal from the arc spot movement detector 5, the number of useless superimposed current pulses can be reduced and the movement of the arc spot can be suppressed efficiently.

Furthermore, since the lamp lighting apparatus in accordance with this embodiment 1 stops the process of suppressing the movement of the arc spot at the same time when not receiving the detection signal from the arc spot movement detector 5, the number of useless superimposed current pulses can be reduced and a reduction in the life of the lamp 1 can be prevented.

In addition, since the lamp lighting apparatus in accordance with this embodiment 1 stops the process of suppressing the movement of the arc spot after a lapse of a predetermined time interval after not receiving the detection signal from the arc spot movement detector 5, the movement of the arc spot can be suppressed surely.

Furthermore, since the lamp lighting apparatus in accordance with this embodiment 1 detects movements of the arc spot lying within a frequency band higher than the critical flicker frequency at which human beings can sense a flicker, the lamp lighting apparatus can detect a movement of the arc spot before human beings sense a flicker.

In addition, since the lamp lighting apparatus in accordance with this embodiment 1 determines the difference between the voltage signal outputted from the first masking unit 14 and the reference waveform outputted from the reference voltage generating unit 15, and compares the difference value with a predetermined threshold so as to detect a movement of the arc spot. Therefore, by generating the reference voltage using the reference voltage generating unit 15 so that it is not influenced by long-term voltage variations, the accuracy of detection of a movement of the arc spot can be improved without being influenced by long-term voltage variations.

Furthermore, since the lamp lighting apparatus in accordance with this embodiment 1 generates a mask wave which is synchronized with the lighting frequency of the lamp 1, and masks the voltage signal which corresponds to the AC rectangular wave applied to the lamp 1 using the mask wave, so as to remove variation components other than the variation component indicating a movement of the arc spot, the accuracy of detection of a movement of the arc spot can be improved.

Furthermore, since the lamp lighting apparatus in accordance with this embodiment 1 stores the voltage signal in which the voltage variation 43 due to the superimposed current pulse is removed by the first masking unit 14 in a memory, and calculates the average of the voltage signals which have been previously stored in the memory as a reference waveform, the movement of the arc spot can be suppressed surely even if the lamp voltage varies in a short span of time which is of order of minutes under the influence of, for example, the halogen cycle.

When furnishing the voltage signal outputted from the first masking unit 14 to an integrating circuit having a predetermined time constant, for example, and using the output signal of the integrating circuit as a reference waveform, instead of storing the voltage signal outputted from the first masking unit 14 in a memory, the responsibility of the arc spot movement detector can be improved and the manufacturing cost of the lamp lighting apparatus can be reduced as compared with a case where the voltage signal is stored in a memory once and the average of the voltage signals which have been previously stored in the memory is calculated as a reference waveform.

Embodiment 2

In above-mentioned embodiment 1, the lamp lighting apparatus stores the voltage signal in which the voltage variation 43 due to the superimposed current pulse is removed by the first masking unit 14 in a memory, and calculates the average of the voltage signals which have been previously stored in the memory as a reference waveform (or simply calculates the average of the voltage signal which has continued for a certain time period using an integrating circuit). In contrast, a lamp lighting apparatus in accordance with this embodiment 2 picks up, as a reference waveform, the value of a voltage signal at predetermined intervals of one half the lighting period of the lamp 1, and calculates, as a reference waveform, the average of the values which are picked up at the predetermined intervals of one half the lighting period of the lamp 1.

In a case of AC lighting, although the both electrodes of the lamp 1 change their roles as an anode and a cathode at every half cycle, the lamp voltage may vary at every half cycle since both the electrodes of the lamp do not necessarily have the same electrode shape.

Therefore, in accordance with this embodiment 2, the lamp lighting apparatus detects and stores the lamp voltage across the electrodes of the lamp in a half cycle in which a specific one of them is the anode, and detects and stores the lamp voltage across the electrodes of the lamp in the next half cycle in which the specific electrode is the cathode, and calculates the average of the detected lamp voltages and sets the calculated average as a reference voltage.

Thus, even when the lamp voltage across the electrodes of the lamp differs at every half cycle, the lamp lighting apparatus can determine a reference voltage (i.e., an averaged voltage) in consideration of the difference.

Therefore, in accordance with this embodiment 2, even when the both electrodes of the lamp 1 differ in shape, a movement of the arc spot can be detected surely.

Embodiment 3

Figure 10:
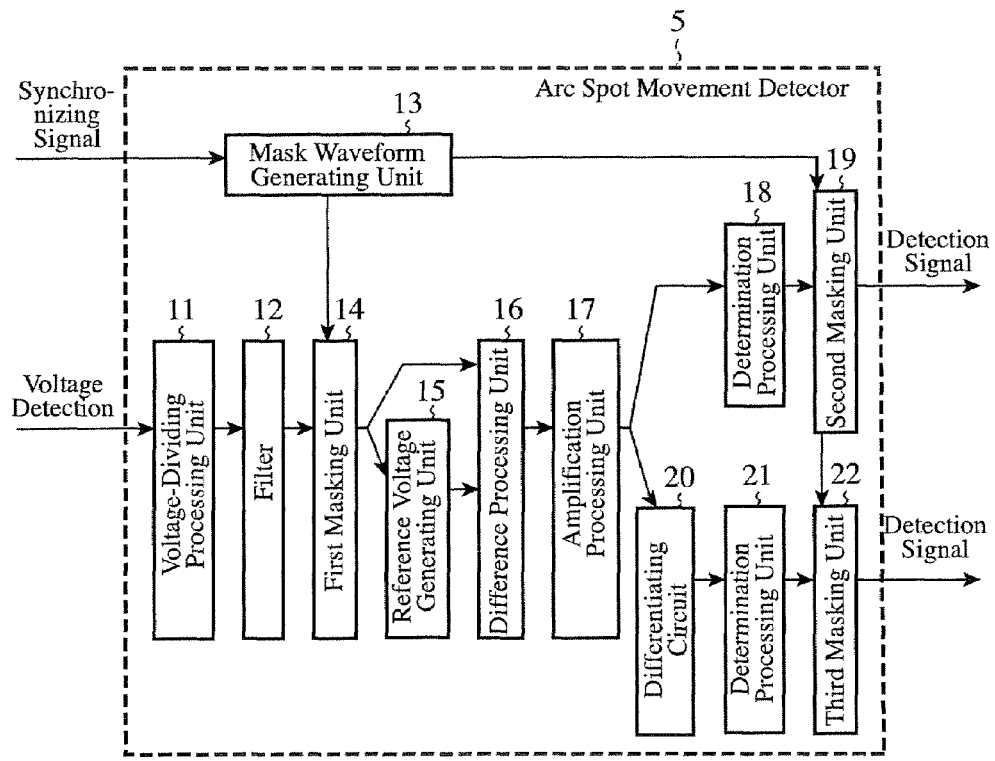
FIG. 10 is a block diagram showing a arc spot movement detector of a lamp lighting apparatus in accordance with embodiment 3 of the present invention.

FIG. 10 is a block diagram showing an arc spot movement detector 5 of a lamp lighting apparatus in accordance with embodiment 3 of the present invention. In the figure, the same reference numerals as shown in FIG. 2 denote the same components or like components, and therefore the explanation of the components will be omitted hereafter.

A differentiating circuit 20 is provided with, for example, a capacitor and a resistor, and carries out a process of differentiating a difference value amplified by an amplification processing unit 17, and then outputting the differentiated difference value to a determination processing unit 21.

The determination processing unit 21 carries out a process of comparing the differential value outputted from the differentiating circuit 20 with a predetermined threshold, and, when then determining that the differentiated difference value exceeds the predetermined threshold, outputting a detection signal to a third masking unit 22.

The third masking unit 22 carries out a process of removing the detection signal outputted from the determination processing unit 21 using a mask wave which is generated by a mask waveform generating unit 13 according to an input of variations in the voltage due to a superimposed current pulse, like the second masking unit 19 of FIG. 2.

Next, the operation of the lamp lighting apparatus in accordance with this embodiment of the present invention will be explained.

In above-mentioned embodiment 1, the arc spot movement detector detects a movement of the arc spot by comparing the difference value amplified by the amplification processing unit 17 with the predetermined threshold, as previously explained. By the way, the amount of voltage variations can be acquired by differentiating the waveform of the difference value. A variation with time in a phenomenon means the time constant of the phenomenon, and can become a parameter which can distinguish it from other different physical phenomena.

A physical phenomenon which causes variations in the voltage or current of the lamp, other than movements of the arc spot, exists. For example, before the lamp 1 bursts, information about a precursor of the burst appears as variations in the voltage or current of the lamp.

Therefore, by acquiring the information about the time constant of variations in the voltage or current of the lamp, it is possible to distinguish movements of the arc spot from other physical phenomena, and to detect other physical phenomena positively.

In accordance with this embodiment 3, the differentiating circuit 20 of the arc spot movement detector 5 differentiates the difference value amplified by the amplification processing unit 17, and outputs the differentiated difference value to the determination processing unit 21.

When receiving the differential value from the differentiating circuit 20, the determination processing unit 21 of the arc spot movement detector 5 compares the differentiated difference value with the predetermined threshold, and, when determining that the differentiated difference value exceeds the predetermined threshold, outputs a detection signal to the third masking unit 22.

When receiving the detection signal from the determination processing unit 21, since it is determined that the detection signal is generated by virtue of an erroneous detection when the detection signal is outputted according to an input of variations in the voltage due to the superimposed current pulse, the third masking unit 22 of the arc spot movement detector 5 carries out a process of removing the detection signal which is generated by virtue of an erroneous detection and which is outputted from the determination processing unit 21 using the mask wave generated by the mask waveform generating unit 13, like the second masking unit 19 of FIG. 2.

As can be seen from the above description, the arc spot movement detector 5 in accordance with this embodiment 3 differentiates the difference value amplified by the amplification processing unit 17, and outputs the differentiated difference value. Therefore, the arc spot movement detector 5 can detect physical phenomena about the arc spot in addition to movements of the arc spot.

Embodiment 4

Figure 11:
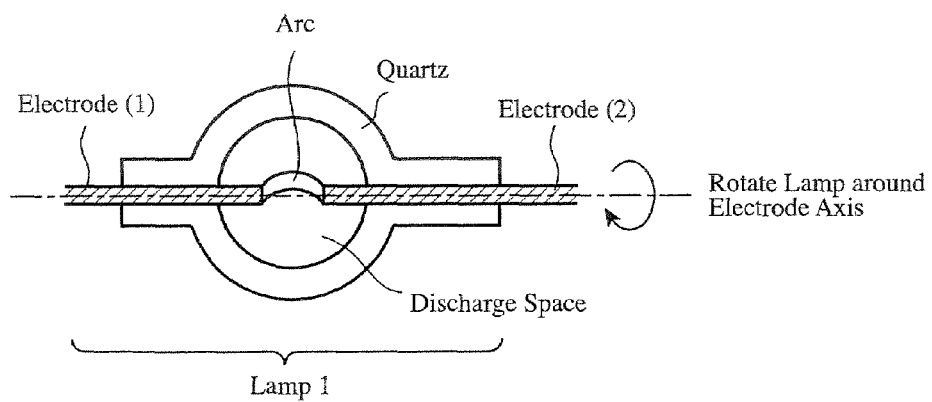
FIG. 11 is an explanatory diagram showing an axis of rotation of a lamp.

As shown in FIG. 11, an electrode axis which connects the electrode (1) with the other electrode (2) in the lamp 1 can be defined as an axis of rotation, and the control unit 6 can make the lamp 11 rotate around the electrode axis, although no mention was made of this structure in above-mentioned embodiment 1.

In accordance with above-mentioned embodiment 1, the control unit 6 executes the superimposed current pulse lighting method so as to suppress movements of the arc spot, as previously explained. In contrast, in accordance with this embodiment 4, the control unit 6 suppresses movements of the arc spot using another method. Specifically, the control unit 6 suppresses movements of the arc spot as follows.

Movements of the arc spot are determined by both fine projections and depressions of the surfaces of the electrodes, and a delicate balance among some forces which are working in the tube. The most dominant one of them which are working in the tube is a force caused by convection resulting from generation of heat of the arc. As a result, a movement of the arc occurs in a vertical direction.

Therefore, by changing a relative spatial relationship between the direction in which the convection occurs and the fine projections and depressions on the surfaces of the electrodes by rotating the lamp 1 around the electrode axis, the control unit 6 can exert a large influence upon movements of the arc spot.

Since it is difficult to predict in advance whether movements of the arc spot are suppressed or become large conversely according to the direction of rotation and angle of rotation of the lamp, it is desirable to determine whether movements of the arc spot are suppressed or become large conversely from the output frequency of the detection signal from the determination processing unit 18 of the arc spot movement detector 5.

In accordance with this embodiment 4, the control unit 6 determines whether movements of the arc spot are suppressed or become large conversely on the basis of the output frequency of the detection signal from the determination processing unit 18 of the arc spot movement detector 5, while rotating the lamp 1 around the electrode axis.

The control unit 6 then adjusts the direction of rotation and angle of rotation of the lamp 1 finely according to the determination so as to finally determine a rotational position of the lamp at which movements of the arc spot occur the most rarely.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lamp lighting apparatus comprising:
a lamp light means for applying an AC rectangular wave to a discharge lamp so as to light the discharge lamp, said lamp light means including a DC power supply, a DCDC converter for adjusting an output of said DC power supply, and an inverter for converting an output of said DCDC converter into the AC rectangular wave;
an arc spot movement detecting means for monitoring an electric parameter of said lamp light means so as to detect a movement of an arc spot lying within a band of frequencies higher than a critical flicker frequency; and
an arc spot movement suppressing means for, when said arc spot movement detecting means detects a movement of the arc spot, controlling the AC rectangular wave applied to said discharge lamp by said lamp light means according to a detection signal indicating the detection of the movement of the arc spot from said arc spot movement detecting means so as to perform a process of suppressing the movement of the arc spot.

2. The lamp lighting apparatus according to claim 1, wherein after detecting a movement of the arc spot, said arc spot movement detecting means monitors the electric parameter of said lamp light means so as to detect disappearance of the movement of the arc spot, and said arc spot movement suppressing means stops the process of suppressing the movement of the arc spot when said arc spot movement detecting means detects disappearance of the movement of the arc spot.

3. The lamp lighting apparatus according to claim 2, wherein when said arc spot movement detecting means detects a movement of the arc spot, said arc spot movement suppressing means raises the amplitude of the AC rectangular wave applied to the discharge lamp by said lamp light means for a fixed time period before polarity of said discharge lamp is reversed using the DCDC converter of said lamp light means, so as to carry out the process of suppressing the movement of the arc spot.

4. The lamp lighting apparatus according to claim 2, wherein the arc spot movement detecting means determines a difference between the electric parameter of the lamp light means and a reference parameter, and compares the difference with a predetermined threshold so as to detect a movement of the arc spot.

5. The lamp lighting apparatus according to claim 2, wherein the arc spot movement suppressing means stops the process of suppressing the movement of the arc spot at a same time when the arc spot movement detecting means detects disappearance of the movement of the arc spot.

6. The lamp lighting apparatus according to claim 2, wherein the arc spot movement suppressing means stops the process of suppressing the movement of the arc spot after a lapse of a predetermined time interval since the arc spot movement detecting means detects disappearance of the movement of the arc spot.

7. The lamp lighting apparatus according to claim 1, wherein when said arc spot movement detecting means detects a movement of the arc spot, said arc spot movement suppressing means raises the amplitude of the AC rectangular wave applied to the discharge lamp by said lamp light means for a fixed time period before polarity of said discharge lamp is reversed using the DCDC converter of said lamp light means, so as to carry out the process of suppressing the movement of the arc spot.

8. The lamp lighting apparatus according to claim 1, wherein the arc spot movement detecting means determines a difference between the electric parameter of the lamp light means and a reference parameter, and compares the difference with a predetermined threshold so as to detect a movement of the arc spot.

9. The lamp lighting apparatus according to claim 8, wherein the arc spot movement detecting means removes variation components lying within a frequency band equal to or higher than a critical flicker frequency from the electric parameter of the lamp light means, and sets the electric parameter from which the variation components are removed as the reference parameter.

10. The lamp lighting apparatus according to claim 8, wherein the arc spot movement detecting means generates a mask wave which is synchronized with a lighting frequency of the discharge lamp, and masks the electric parameter of the lamp light means using the mask wave so as to remove variation components other than a variation component indicating a movement of the arc spot.

11. The lamp lighting apparatus according to claim 8, wherein the arc spot movement detecting means stores the electric parameter of the lamp light means therein, and determines the reference parameter from electric parameters which have been previously stored therein.

12. The lamp lighting apparatus according to claim 11, wherein the arc spot movement detecting means acquires the reference parameter from the electric parameters which have been previously stored therein at predetermined intervals of one half of a lighting period of the discharge lamp.

13. The lamp lighting apparatus according to claim 8, wherein the arc spot movement detecting means differentiates a difference between the electric parameter of the lamp light means and the reference parameter, and outputs the differentiated difference value.

14. The lamp lighting apparatus according to claim 1, wherein the arc spot movement suppressing means starts the process of suppressing the movement of the arc spot at a same time when the arc spot movement detecting means detects the movement of the arc spot.

15. The lamp lighting apparatus according to claim 1, wherein the arc spot movement suppressing means starts the process of suppressing the movement of the arc spot after a lapse of a predetermined time interval since the arc spot movement detecting means detects the movement of the arc spot.

16. A lamp lighting apparatus comprising:
a lamp light means for applying an AC rectangular wave to a discharge lamp so as to light the discharge lamp;
an arc spot movement detecting means for monitoring an electric parameter of said lamp light means so as to detect a movement of an arc spot lying within a band of frequencies higher than a critical flicker frequency; and
an arc spot movement suppressing means for, when said arc spot movement detecting means detects a movement of the arc spot, controlling an angle of rotation of the discharge lamp around an axis of rotation, which is an electrode axis which connects both electrodes of the discharge lamp with each other, according to a detection signal indicating the detection of the movement of the arc spot from said arc spot movement detecting means so as to perform a process of suppressing the movement of the arc spot.

* * * * *